United States Patent [19]

Brendemuehl

[11] Patent Number: 4,733,962
[45] Date of Patent: Mar. 29, 1988

[54] JET VELOCITY MEASURING APPARATUS

[75] Inventor: Roger C. Brendemuehl, Beloit, Wis.

[73] Assignee: Beloit Corporation, Beloit, Wis.

[21] Appl. No.: 847,653

[22] PCT Filed: Jan. 24, 1986

[86] PCT No.: PCT/US86/00149
§ 371 Date: Mar. 17, 1986
§ 102(e) Date: Mar. 17, 1986

[87] PCT Pub. No.: WO87/04524
PCT Pub. Date: Jul. 30, 1987

[51] Int. Cl.[4] .................. G01P 3/36; G01P 5/22; H01J 5/02
[52] U.S. Cl. .................. 356/28; 73/861.06; 250/239; 250/573; 350/584
[58] Field of Search .................. 356/28; 250/573, 239; 350/584; 73/861.05, 861.06

[56] References Cited

U.S. PATENT DOCUMENTS

| 3,903,877 | 9/1975 | Terada | 350/584 X |
| 3,953,126 | 4/1986 | Kim et al. | 356/28 |
| 4,201,467 | 5/1980 | Hartmann et al. | 356/28 |
| 4,281,646 | 8/1981 | Kinoshita | 350/584 X |
| 4,497,550 | 2/1985 | Ouchi et al. | 350/584 |

FOREIGN PATENT DOCUMENTS 8505187  11/1985  PCT Int'l Appl. .................. 356/28

OTHER PUBLICATIONS

Ishida et al., "Measurement of the Velocity and Direction of Flow of Solid Particles in a Fluidized Bed", Powder Technology, vol. 27, #1, Sep.–Oct. 1980, pp. 1–6.

Primary Examiner—Stephen C. Buczinski
Assistant Examiner—Linda J. Wallace
Attorney, Agent, or Firm—Dirk J. Veneman; Raymond W. Campbell; David J. Archer

[57] ABSTRACT

A jet velocity measuring apparatus is disclosed for measuring the velocity of a fluid stream. The apparatus (10) measures the time delay between primary electronic signals generated by a first photosensitive device (32) as a result of a first beam of light from a light source (34) being reflected by a portion of the surface (S) of the stream (24) and secondary electronic signals generated by a second photosensitive device (36) as a result of a second beam of light from a light source (38) being reflected downstream by substantially the same portion of the surface of the stream (24). The apparatus includes a housing (22) disposed parallel to the plane (P2) of the surface of the stream. A first and a second fiberoptic bundle (42, 44) transmit light from the light source (34, 38) to the surface of the stream (24) and back respectively to the photosensitive devices (32, 36). Debris-deflecting slots (88, 90) are disposed adjacent to the housing (22) for deflecting debris therefrom.

10 Claims, 17 Drawing Figures

JET VELOCITY MEASURING APPARATUS

BACKGROUND OF THE INVENTION

1. Field of the Invention

This invention relates to a jet velocity measuring apparatus for measuring the velocity of a fluid stream. More particularly, this invention relates to a jet velocity measuring apparatus having a debris-deflecting slot for directing a curtain of air past the respective terminations of light-transmitting fiberoptic bundles of the measuring apparatus.

2. Information Disclosure Statement

U.S. Ser. No. 573,387 by Daniel Parker filed Jan. 24, 1984 and assigned to the Beloit Corporation teaches a method and apparatus for measuring the jet velocity adjacent a headbox of a papermaking machine. All the disclosure of the aforementioned pending patent application is incorporated by reference into the present application.

Copending U.S. Ser. No. 573,387 describes a first and a second fiberoptic bundle for measuring the flow velocity of pulp issuing from a headbox. More specifically, a first light beam passes through the first fiberoptic bundle towards the jet and is reflected back along the first fiberoptic bundle which is bifurcated thereby permitting the reflected beam to be transmitted to a first photosensitive device. The first photosensitive device generates a first electronic series of signals which correspond with that portion of the surface of the stream on which the first beam is reflected. A second beam of light passes through the second fiberoptic bundle towards the jet so that the second beam of light is reflected from the same portion of the stream downstream. The second beam of light is reflected back along the second fiberoptic bundle which is bifurcated enabling the second beam of light to be transmitted to a second photosensitive device to generate a second series of electronic signals. Various electronic apparatus is utilized to compare the first and second series of signals and to measure the time difference between a particular pattern of signals received from the second photosensitive device that correspond with signals received from the first photosensitive device indicating that that portion of the jet has flowed downstream towards the second beam of light. From the measurement of the time taken by such portion of the jet to flow between the first and second beam and knowing the distance between the beams of light, an accurate measure of the jet velocity is determinable.

Prior to the aforementioned copending application, various flow measuring devices had been proposed but most of the prior proposals involved the immersion of a pressure-sensitive device within the jet stream. Such pressure-sensitive devices, of necessity interfered with the smooth flow of the jet of stock of pulp extruded from the slice of the headbox onto the forming wire.

In the papermaking art, a need has existed for a reliable and accurate apparatus for measuring the jet velocity of pulp extruded from a headbox so that such velocity could be adequately controlled in order to approximate the velocity of the forming wire. By accurately controlling the jet velocity to approximately that of the forming wire, the fibers within the pulp are more evenly distributed over the surface of the forming wire.

In addition to the aforementioned pending patent application, another non-contacting flow velocity device has been developed utilizing the Doppler effect in an ultrasonic flow meter. However, an article published October 1985 in Paper Trade Journal, page 42, and entitled "Advancements in Doppler Flow Metering Improve Accuracy And Reliability" by William T. Smith, states that "The Doppler Flow Meter does have limitations. Heavily scaled or coated pipes, excessive pump noise and vibration, pulsating flows, and some hydrocarbon based applications can pose difficulties for the flow meter. Engineers who require extremely accurate readings in high temperature and/or sonically clean applications will currently not select a Doppler Flow Meter." In view of the extremely noisy environment typical of the forming section of a papermaking machine, it is evident that such Doppler Flow Meters have severe limitations in the foregoing application.

U.S. Pat. No. 4,517,845 to Ransheim et al teaches a flow velocity measuring apparatus for a jet of molten glass. This apparatus corelates amplitude variations in signals using two spaced radiation detectors along the path adjacent the flow path of the glass.

The aforementioned pending patent application, Ser. No. 573,387 is an improvement over the basic concept of U.S. Pat. No. 4,517,845 in the provision of bifurcated fiberoptic bundles. However, a problem has existed in the application of the device of the forementioned pending application in that due to the need for placing the terminations of the fiberoptic bundles approximately 0.6 centimeters from the surface of the jet, particles of the pulp tend to be splashed onto the terminations of the fiberoptic bundles thereby impeding the transmission of the light beams.

The present invention overcomes the aforementioned problem by providing a pressurized curtain of air across the terminations of the fiberoptic bundles thereby inhibiting accumulation of debris that would otherwise impede the transmission of the first and second light beams toward and away from the fluid stream.

Furthermore, in the device disclosed in the copending application, the first and second light beams passing from the terminations of the fiberoptic bundles towards the surface of the stream were generally circular in cross section. Consequently, any slight misalignment of the first and second light beams relative to the direction of flow of the fluid stream resulted in inaccurate signal readings.

The present invention overcomes the problem of inaccuracy of signal readings by providing elongate terminations of the fiberoptic bundles. Such elongate terminations produce elongate beams of light which are transmitted between the terminations of the bundles and the surface of the stream. By providing such elongate beams of light, if the beams of light are slightly misaligned relative to the fluid flow such misalignment causes negligible difference in the signal output.

Therefore, it is a primary objective of the present invention to overcome the aforementioned inadequacies of the prior art devices and to provide a jet velocity measuring apparatus providing a significant contribution to quality control in the papermaking art.

Another object of the present invention is the provision of a jet velocity measuring apparatus which includes a debris-deflecting means disposed adjacent to the first face of a housing for deflecting debris from the first face of the housing thereby inhibiting accumulation of the debris on the first face which would otherwise impede transmission of the first and second beams of light towards and away from the fluid stream.

Another object of the present invention is the provision of a jet velocity measuring apparatus including a first and second plenum defined by the housing for supplying an elongate curtain of debris-deflecting air towards the first and second terminations respectively of the fiberoptic bundles. Such curtain deflects debris away from the housing thereby inhibiting accumulation of debris on the first face of the housing which could otherwise impede transmission of the first and second beams of light towards and away from the fluid stream.

Another object of the present invention is the provision of a jet velocity measuring apparatus including a first and a second fiberoptic bundle, the fiberoptic bundles being elongate in a direction transverse relative to the direction of flow of the fluid stream such that misalignment of the terminations of the first and second fiberoptic bundles relative to the direction of flow of the fluid stream results in substantially no variation between the respective signals generated by the first and second photosensitive devices.

Other objects and advantages resulting from the application of the present invention will be apparent to those skilled in the art.

SUMMARY OF THE INVENTION

This invention relates to a jet velocity measuring apparatus for measuring the velocity fo a fluid stream. The measuring apparatus measures the time delay between primary electronic signals generated by a first photosensitive device as a result of a first beam of light from a light source being reflected by a portion of the surface of the stream and secondary electronic signals generated by a second photosensitive device as a result of a second beam of light from a light source being reflected downstream by substantially the same portion of the surface of the stream. The apparatus includes a housing disposed adjacent to the fluid stream, the housing having a first face disposed in a plane substantially parallel to the plane of the adjacent surface of the stream. A first bifurcated fiberoptic bundle is secured to the housing adjacent to the first face for transmitting the first beam of light from the light source to the portion of the surface of the stream and back towards the first photosensitive device. A second bifurcated fiberoptic bundle is secured to the housing and terminates adjacent to the first face and downstream relative to the termination of the first fiberoptic bundle. The second fiberoptic bundle transmits the second beam of light from the light source to substantially the same portion of the surface of the stream when this portion of the surface of the stream has flowed downstream away from the first beam of light. The second fiberoptic bundle transmits the reflected second beam of light back along the second fiberoptic bundle towards the second photosensitive device.

A debris-deflecting device is disposed adjacent to the first face of the housing for deflecting debris from the first face of the housing thereby inhibiting accumulation of debris on the first face which could otherwise impede transmission of the first and second beams of light towards and away from the fluid stream.

In a more specific embodiment of the present invention, the housing is adjustably disposed adjacent to the adjacent surface of the stream. The housing also includes a first member which defines a first channel which in use of the apparatus is connected to a source of gaseous pressure. A second member is disposed adjacent to the first member with the second member defining a first and a second opening for the reception therein respectively of the first and second fiberoptic bundle. The terminations of the first and the second fiberoptic bundles are disposed substantially coplanar with the first face of the second member. The second member also defines a second channel which is in fluid communication with the first channel. A third member is disposed adjacent to the second member such that the second member is disposed between the first and the third members with the third member defining a third channel which is in fluid communication with the second channel. The third member also defineees a fourth channel which is disposed transversely relative to, and in fluid communication with, the third channel.

The third member defines a fifth channel disposed transversely relative to the fourth channel. The third member also defines a sixth and seventh channel such that the sixth and seventh channels extend from the transverse fifth channel towards the second member and in fluid communication therewith. The second member also defines an eighth and ninth channel such that the eighth and ninth channels are in fluid communication with respectively the sixth and seventh channels of the third member. The second member also defines a first and a second plenum such that the first and second plenums are in fluid communication respectively with the eighth and ninth channels so that in use of the apparatus the first and the second plenums are pressurized from the source of gaseous pressure.

A first and a second orifice are defined by the second member such that the first and second orifices extend respectively from the first and second plenums towards the first and second terminations respectively such that a gaseous flow extends from the plenums through the orifices and past the terminations for inhibiting the accumulation of debris adjacent to the terminations. The first and second orifices are elongate slots defined by the second member. The second member also includes a first and second lip which extend respectively towards the terminations of the first and second fiberoptic bundles such that the gaseous debris-deflecting curtain is directed past such terminations.

In a preferred embodiment of the present invention, a third fiberoptic bundle is secured to the housing adjacent to the first face and further downstream relative to the termination of the second fiberoptic bundle. The third fiberoptic bundle transmits a third beam of light from the light source to substantially the same portion of the surface of the stream when this portion of the surface of the stream has flowed further downstream past the termination of the second fiberoptic bundle. The third fiberoptic bundle transmits the reflected third beam of light back along the third fiberoptic bundle towards a third photosensitive device thereby increasing the sensitivity of the measuring apparatus when measuring a relatively fast flowing stream. Each of the fiberoptic bundles includes a pair of bifurcated branches with one of the branches being disposed adjacent the light source and the other branch being disposed adjacent to the respective photosensitive device.

In carrying out the present invention, the first and second fiberoptic bundles are used when measuring the velocity of a relatively low speed jet. The second and third bundles are used for medium speed and the first and third bundles are used for a high speed jet.

In a preferred embodiment of the present invention, the respective terminations of the fiberoptic bundles are elongate in a direction transverse relative to the direction of flow of the fluid stream such that misalignment of the terminations of the first and second fiberoptic bundles relative to the direction of flow of the fluid stream results in substantially no variation between the respective signals generated by the respective photosensitive devices.

As will be apparent to those skilled in the art, various modifications of the present invention may be made without departing from the spirit and scope of the present invention as disclosed in the accompanying drawings and as described in the detailed description and as defined by the appended claims.

Although the present invention is described particularly as applied to measuring the jet velocity of a stream of pulp emerging from the slice of a headbox prior to contact with a forming wire, it will be apparent to those skilled in the art that the measuring apparatus of the present invention has equal application to the measurement of the velocity of any liquid stream including measuring the flow velocity of a stream flowing through a pipe or even the measurement of the velocity of a relatively extendible sheet material which would otherwise be difficult to measure.

BRIEF DESCRIPTION OF THE DRAWINGS

Similar reference numerals are applied to the same elements throughout the various views of the drawings.

DETAILED DESCRIPTION

Figure 1:
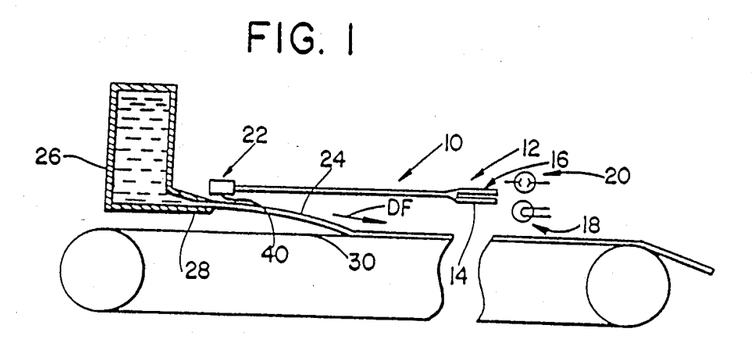
FIG. 1 is a diagramatic representation of the jet velocity measuring apparatus of the present invention with the apparatus disposed adjacent a headbox of a papermaking machine and showing the housing of the measuring apparatus disposed above the jet prior to the jet contacting the former wire.

The present invention relates to a jet velocity measuring apparatus and method for measuring the velocity of a fluid stream. The measuring apparatus generally designated 10 is shown in FIG. 1 and includes a plurality of bifurcated bundles generally designated 12. The bifurcated fiberoptic bundles include a first and a second branch generally designated 14 and 16 respectively with the first branch 14 being disposed adjacent to a light source generally designated 18. The second branch 16 is disposed adjacent to a photosensitive device generally designated 20. The other end of the fiberoptic bundles 12 terminate in a housing generally designated 22 which is disposed above and adjacent to a stream or jet of pulp 24 extruded from a headbox 26 of a papermaking machine. The stream 24 is extruded from a slice 28 of the headbox 26 and is directed onto a forming wire generally designated 30 shown diagramatically in FIG. 1.

In the papermaking art, it is advantageous that the speed of the jet stream 24 extruded from the slice 28 be controlled to approximate the velocity of the forming wire 30. The measuring apparatus 10 shown in FIG. 1 enables an accurate determination of the jet velocity so that the pressure within the headbox 26 can be varied to regulate this jet velocity to coincide with that of the wire 30.

Figure 2:
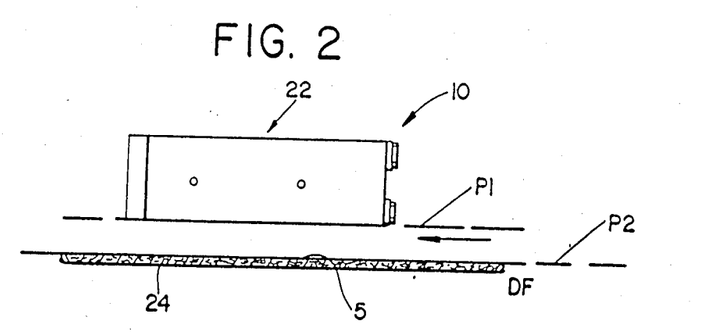
FIG. 2 is a reverse side elevational view of the housing of the measuring apparatus shown in FIG. 1.

FIG. 2 is a reverse side elevational view of the housing 22 disposed approximately 0.6 centimeters above the pulp jet 24.

Figure 3:
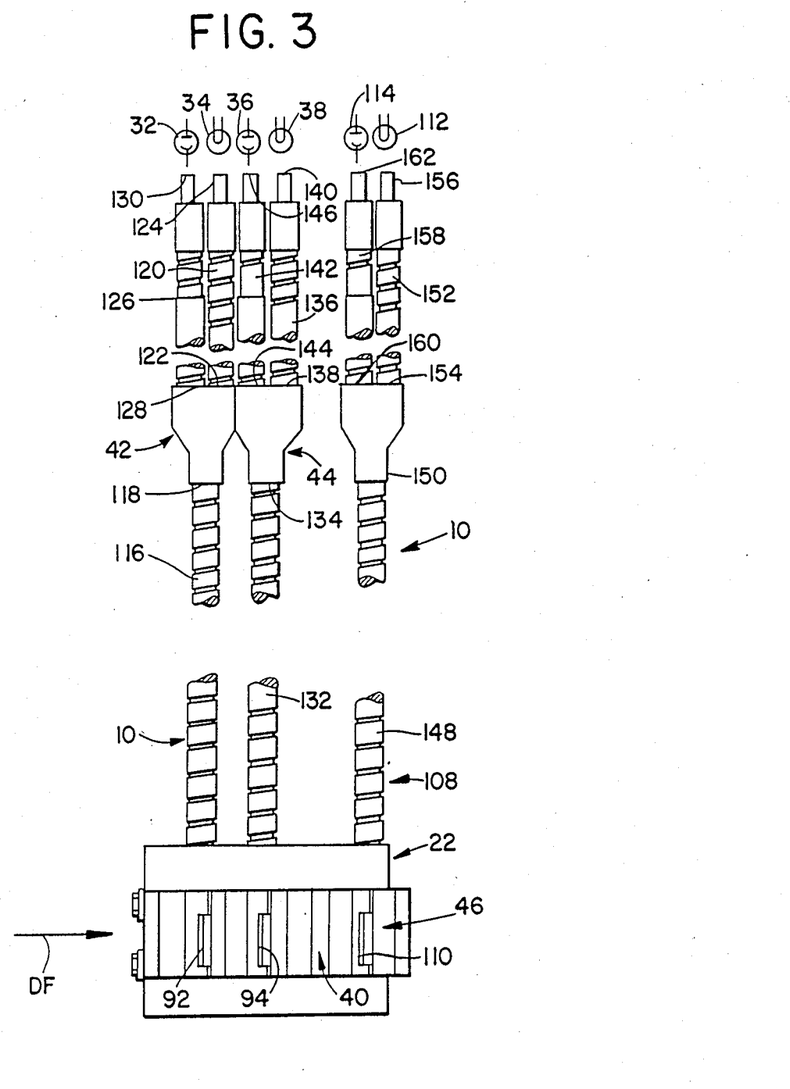
FIG. 3 is a bottom plan view of the housing shown in FIG. 2 showing the first, second and third fiberoptic bundles.

FIG. 3 is a bottom plan view of the jet velocity measuring apparatus 10 for measuring the velocity of the fluid stream 24. The apparatus 10 measures the time delay between primary electronic signals generated by a first photosensitive device 32 as the result of a first beam of light from a first light source 34 being reflected by a portion of the surface of the stream 24 and secondary electronic signals generated by a second photosensitive device 36 as the result of a second beam of light from a second light source 38 being reflected downstream by substantially the same portion of the surface of the stream 24. The apparatus 10 includes the housing 22 disposed adjacent to the fluid stream 24. The housing 22 has a first face generally designated 40 shown in FIG. 1 which is diposed in a plane P1 substantially parallel to the plane P2 of the adjacent surfaces of the stream as shown in FIG. 2.

A first bifurcated fiberoptic bundle generally designated 42 and shown in FIG. 3 is secured to the housing 22 adjacent to the first face 40 for transmitting the first beam of light from the first light source 34 to the portion of the surface of the stream 24 and back towards the first photosensitive device 32.

A second bifurcated fiberoptic bundle generally designated 44 is secured to the housing 22 and terminates adjacent to the first face 40 and downstream relative to the termination of the first fiberoptic bundle 42. The second fiberoptic bundle 44 transmits the second beam of light from the second light source 38 to substantially the same portion of the surface of the stream 24 when this portion of the surface of the stream 24 has flowed downstream away from the first beam of light. The second fiberoptic bundle 44 transmits the reflected second beam of light back along the second fiberoptic bundle 44 towards the second photosensitive device 36.

A debris-deflecting means generally designated 46 is disposed adjacent to the first face 40 of the housing 22 for deflecting debris away from the first face 40 of the housing 22 thereby inhibiting accumulation of debris on the first face 40 which could otherwise impede transmission of the first and second beams of light towards and away from the fluid stream 24.

The housing 22 is adjustably disposed adjacent to the adjacent surfaces of the stream 24 as described hereinafter.

Figure 4:
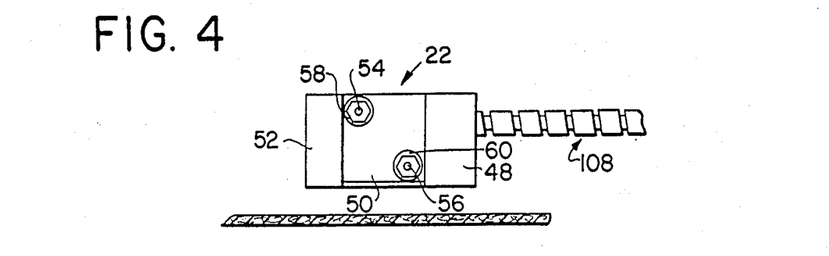
FIG. 4 is a rear view of the housing shown in FIG. 2 as viewed from upstream.

FIG. 4 is a rear elevational view of the housing 22 when viewed from upstream. The housing 22 includes a first, second and third member 48, 50 and 52 respectively. The second member 50 includes a first and second threaded rod 54 and 56 respectively extending through the length of the second member 50 with the first and second rods 54 and 56 threadably engaging a first and second nut 58 and 60 respectively. The rods 54 and 56 and nuts 58 and 60 cooperate to secure together the various portions of the second member to be described hereinafter.

Figure 5:
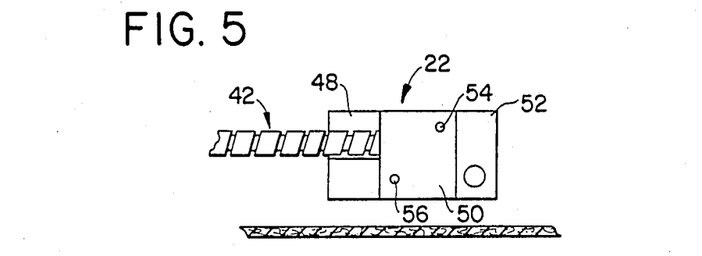
FIG. 5 is a front view of the housing shown in FIG. 2 but viewed from downstream.

FIG. 5 is a front view of the housing 22 showing the first, second and third members 48, 50 and 52 and the first and second rods 54 and 56 respectively.

Figure 6:
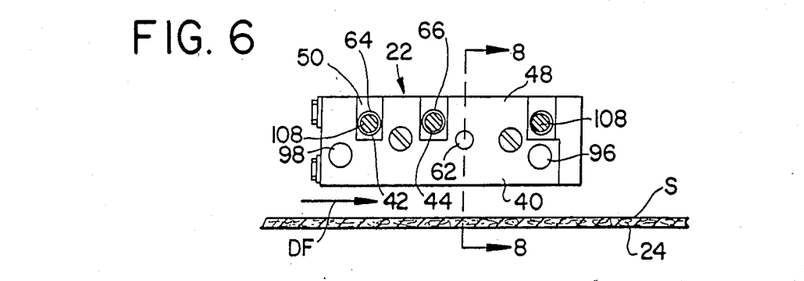
FIG. 6 is a side elevational view of the housing shown in FIG. 2 but viewed from the opposite side from the side shown in FIG. 2.

FIG. 6 is a side elevational view of the housing 22 viewed from the opposite side to that shown in FIG. 2.

As shown in FIG. 6, the first member 48 of the housing 22 defines a first channel 62 which in use of the apparatus 10 is connected to a source of gaseous pressure (not shown).

FIG. 6 shows the second member 50 disposed adjacent to the first member 48 with the second member 50 defining a first and a second opening 64 and 66 for the reception therein respectively of the first and second fiberoptic bundles 42 and 44 such that the terminations of the first and second fiberoptic bundles 42 and 44 are disposed substantially coplanar with the first face 40 of the second member 50 as described hereinafter.

Figures 7, 8:
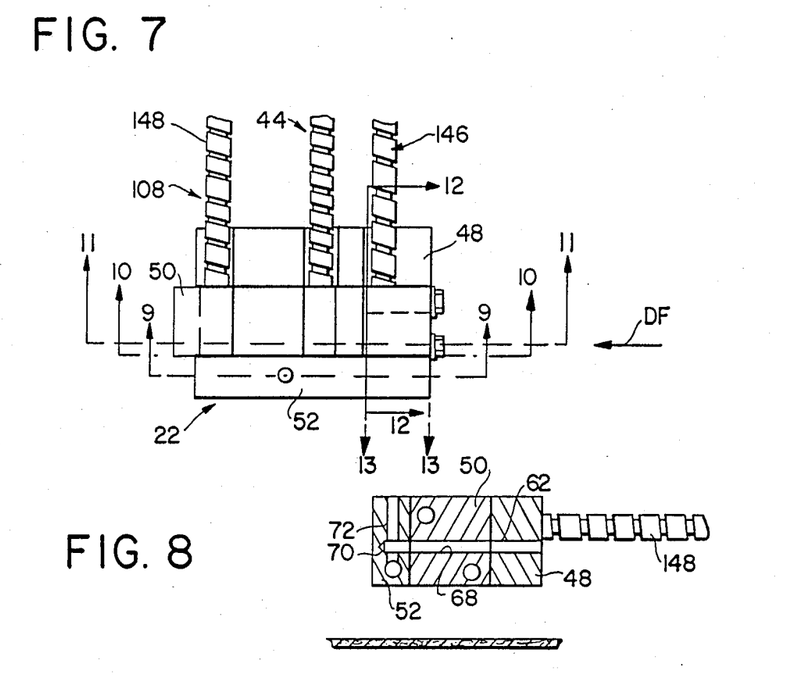
FIG. 7 is a top plan view of the housing shown in FIG. 2 including portions of the bifurcated fiberoptic bundles.
FIG. 8 is a sectional view taken on the line 8—8 of FIG. 6.

FIG. 7 is a top plan view of the housing 22 showing the first, second and third members 48, 50 and 52 respectively.

FIG. 8 is a sectional view taken on the line 8—8 of FIG. 6 showing the first channel 62 extending through the first member 48. As shown in FIG. 8, the second member 50 defines a second channel 68 which is in fluid communication with the first channel 62. The third member 52 is disposed adjacent to the second member 50 such that the second member 50 is disposed between the first and third members 48 and 52 respectively. The third member 52 defines a third channel 70 which is in fluid communication with the second channel 68. The third member 52 also defines a fourth channel 72 which is disposed transversely relative to and in fluid communication with the third channel 70.

Figure 9:
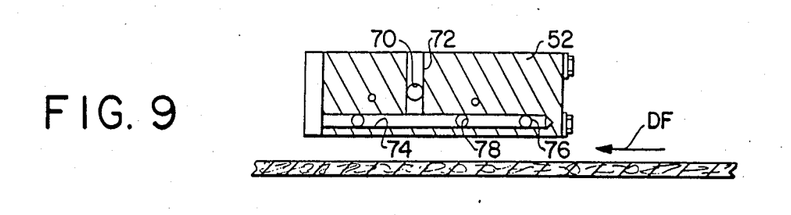
FIG. 9 is a sectional view taken on the line 9—9 of FIG. 7.

FIG. 9 is a sectional view taken on the line 9—9 of FIG. 7 and shows the fourth channel 72 disposed transversely relative to the third channel 70. The third member 52 also defines a fifth channel 74 which is disposed transversely relative to the fourth channel 72. As shown in FIG. 9, the third member 52 also defines a sixth and seventh channel 76 and 78 respectively which extend from the transverse fifth channel 74 towards the second member 50 with the sixth and seventh channels 76 and 78 being in fluid communication with the fifth channel 74.

Figure 10:
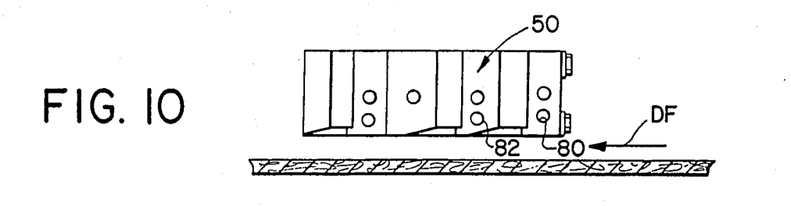
FIG. 10 is a sectional view taken on the line 10—10 of FIG. 7.

As shown in FIG. 10 which is a sectional view taken on the line 10—10 of FIG. 7, the second member 50 further defines an eighth and ninth channel 80 and 82 respectively such that the eighth and ninth channels 80 and 82 are in fluid communication with respectively the sixth and seventh channels 76 and 78 of the third member 52.

Figure 11:
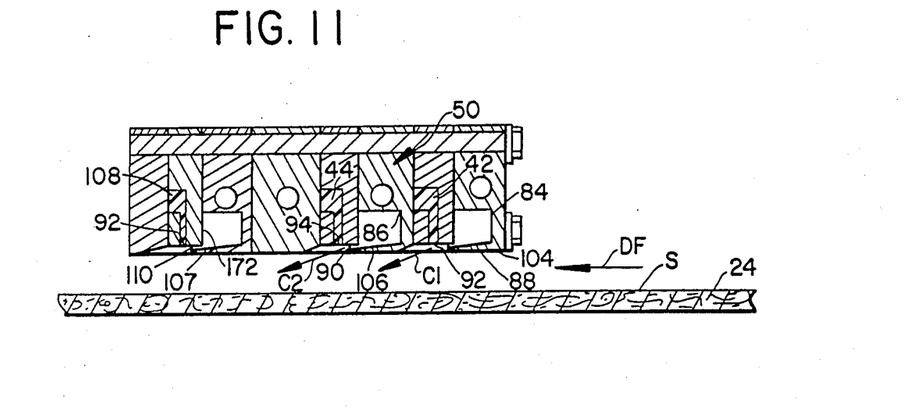
FIG. 11 is an enlarged sectional view taken on the line 11—11 of FIG. 7 and shows the first, second and third plenums.

FIG. 11 is an enlarged sectional view taken on the line 11—11 of FIG. 7 and shows the second member 50 further defining a first and second plenum 84 and 86 such that the first and second plenums 84 and 86 are in fluid communication respectively with the eighth and ninth channels 80 and 82 so that in use of the apparatus 10 the first and second plenums 84 and 86 are pressurized from the source of gaseous pressure.

A first and a second orifice 88 and 90 are defined by the second member 50 such that the first and second orifice 88 and 90 extend respectively from the first and second plenums 84 and 86 toward first and second terminations 92 and 94 respectively of the first and second fiberoptic bundles 42 and 44 such that a gaseous flow C1 and C2 extends from the plenums 84 and 86 through the orifices 88 and 90 and past the terminations 92 and 94.

Figures 12, 13:
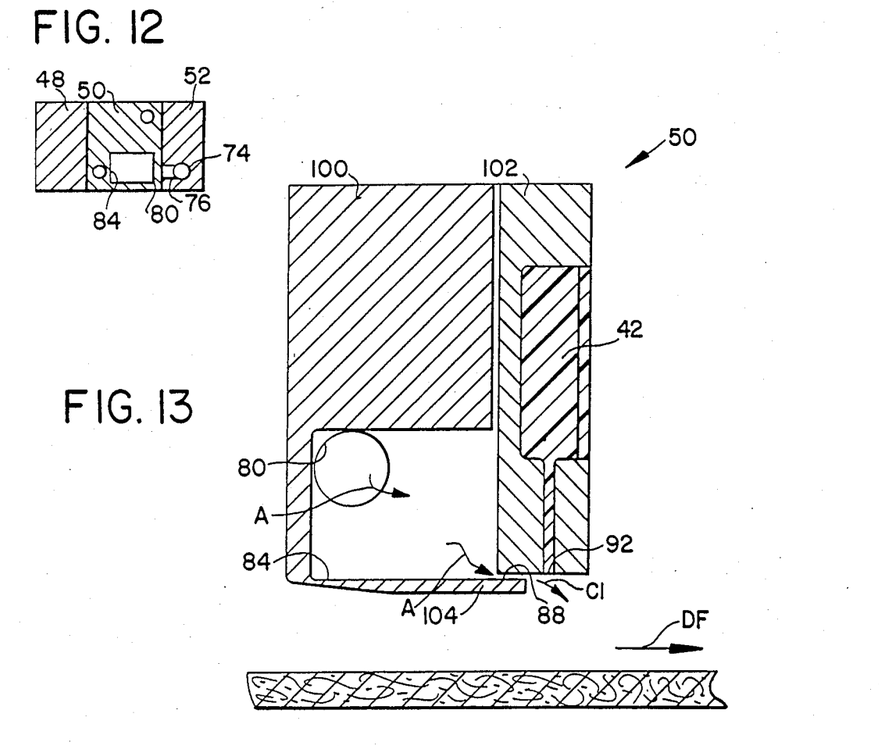
FIG. 12 is a sectional view taken on the line 12—12 of FIG. 7.
FIG. 13 is an enlarged sectional view taken on the line 13—13 of FIG. 7 showing the third plenum and the third lip.

FIG. 12 is a sectional view taken on the lines 12—12 of FIG. 7 and shows the transverse fifth channel 74 and sixth channel 76 in fluid communication with the eighth channel 80 which permits pressurization of the first plenum 84.

FIG. 13 is an enlarged sectional view taken on the line 13—13 of FIG. 7 and shows the eighth channel 80 in fluid communication with the first plenum 84 such that pressurized air flows as indicated by arrows A from the first plenum 84 through the first orifice 88 such that a gaseous flow, or first curtain, indicated by the arrow C1 sweeps past the first termination 92 of the first fiberoptic bundle 42 for inhibiting the accumulation of debris adjacent to the first termination.

FIG. 6 also shows a first and second threaded bore 96 and 98 respectively defined by the first member 48 such that the bores 96 and 98 cooperate with a housing support structure (not shown) enabling the first member 48 and housing 22 to be adjustably secured at a predetermined distance relative to the adjacent surface S of the stream 24.

Figure 14:
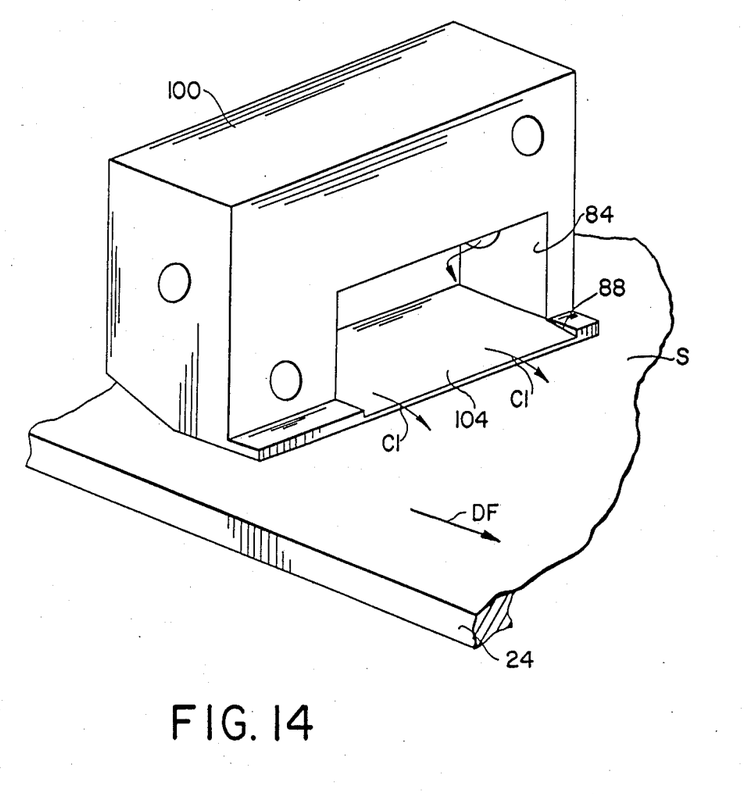
FIG. 14 is a perspective view of a first portion of the second member showing the first plenum and the first lip.

The first and second orifices 88 and 90 shown in FIG. 11 are of elongate configuration as particularly shown in the perspective view shown in FIG. 14. The first plenum 84 is defined by a first portion 100 of the second member 50 as shown in FIG. 14. The first portion 100 cooperates with a second portion 102 of the second member 50 as shown in FIG. 13 such that the first and second portions 100 and 102 define therebetween the first orifice 88 which is an elongate slot defined by the second member 50.

The first portion 100 includes a first lip 104 of the first orifice 88 as shown in FIGS. 13 and 14 with the first lip 104 disposed adjacent to the adjacent surface S of the stream 24. The first lip 104 extends towards the first termination 92 of the first fiberoptic bundle 42 such that a gaseous, debris-deflecting first curtain C1 is directed past the termination 92 of the first fiberoptic bundle 42.

A second lip 106 of the second orifice 90 (shown in FIG. 11) is disposed towards the adjacent surface S of the stream 24. The second lip 106 extends towards the second termination 94 of the second fiberoptic bundle 44 such that a gaseous, debris-deflecting second curtain C2 is directed past the second termination 94 of the second fiberoptic bundle 44.

Although the present invention is directed primarily to the provision of a debris-deflecting means 46 and to the provision of elongate terminations 92 and 94 of the first and second fiberoptic bundles 42 and 44, a preferred embodiment of the present invention includes a third fiberoptic bundle 108 as shown in FIGS. 3, 6, 7 and 11. It should be appreciated by those skilled in the art that the provision of a third fiberoptic bundle 108 spaced further downstream relative to the second fiberoptic bundle 44 enables a more accurate determination of the jet velocity. When measuring the velocity of a jet 24 issuing from the slice 28 of a headbox (at relatively high velocities) the time taken for a particular portion of the surface of the stream to travel between the first and third terminations 92 and 110 of the first and third fiberoptic bundles 42 and 108 will be greater than the time taken for the flow of such portion between the first and second terminations 92 and 94.

In practice of the present invention, the first and second fiberoptic bundles 42 and 44 are used when measuring the velocity of a relatively low speed jet. The second and third bundles 44 and 108 are used for medium jet speed and the first and third bundles 42 and 108 are used for relatively high jet speed. A simple electrical switching device (not shown) may be used for selecting an appropriate low, medium or high setting of the present apparatus.

Accordingly, the jet velocity measuring apparatus 10 also includes the third fiberoptic bundle 108 secured to the housing 22 adjacent to the first face 40 and disposed further downstream relative to the termination 94 of the second fiberoptic bundle 44. The third fiberoptic bundle 108 transmits a third beam of light from a third light source 112 as shown in FIG. 3, to substantially the same portion of the surface of the stream 24 when that portion of the surface of the stream 24 has flowed further downstream past the second termination 94 of the second fiberoptic bundle 44. The third fiberoptic bundle 108 transmits the reflected third beam of light back along the third fiberoptic bundle 108 towards a third photosensitive device 114 as shown in FIG. 3 thereby increasing the sensitivity of the measuring apparatus 10 when measuring a relatively fast-flowing stream 24.

Referring back particularly to FIG. 3, the jet velocity measuring apparatus 10 includes the first fiberoptic bundle 42. This fiberoptic bundle 42 includes a first portion 116 having the first termination 92 and a second end 118. The first termination 92 is anchored within the housing 22 with the first termination 92 of the first portion 116 being disposed substantially coplanar with the first face 40 of the housing 22 so that the first beam of light emerges substantially normal relative to the first face 40 of the housing 22.

A first branch 120 of the first fiberoptic bundle 42 has a first and second end 122 and 124 respectively. The first end 122 of the first branch 120 is optically-connected to the second end 118 of the first portion 116. The second end 124 of the first branch 120 is disposed adjacent to the first light source 34 such that the first beam of light is transmitted from the first light source 34 to the second end 124 of the first branch 120 towards the first termination 92 of the first portion 116.

A second branch 126 includes a first and second end 128 and 130 respectively. The first end 128 of the second branch 126 is optically-connected to the second end 118 of the first portion 116. The second end 130 of the second branch 126 is disposed adjacent to the first photosensitive device 32 such that the first beam of light reflected from the portion of the surface of the stream 24 back through the first portion 116 is transmitted through the second branch 126 towards the first photosensitive device 32.

The second fiberoptic bundle 44 includes a second portion 132 having the second termination 94 and a second end 134. The second termination 94 is anchored within the housing 22 with the second termination 94 of the second portion 132 being disposed substantially coplanar with the first face 40 of the housing 22 so that the second beam of light emerges substantially normal relative to the first face 40 of the housing 22.

A third branch 136 has a first and second end 138 and 140 respectively. The first end 138 of the third branch 136 is optically-connected to the second end 134 of the second portion 132. The second end 140 of the third branch 136 is disposed adjacent to the second light source 38 such that the second beam of light is transmitted from the second light source 38 to the second end 140 of the third branch 136 towards the second termination 94 of the second portion 132.

A fourth branch 142 has a first and a second end 144 and 146 respectively. The first end 144 of the fourth branch 142 is optically-connected to the second end 134 of the second portion 132. The second end 146 of the fourth branch 142 is disposed adjacent to the second photosensitive device 36 such that the second beam of light reflected from the portion of the surface S of the stream 24 back through the second portion 132 is transmitted through the fourth branch 142 towards the second photosensitive device 36.

The third fiberoptic bundle 108 includes a third portion 148 having a third termination 110 and a second end 150. The third termination 110 is anchored within the housing 22 with the third termination 110 of the third portion 148 being disposed substantially coplanar with the first face 40 of the housing 22 so that the third beam of light emerges substantially normal relative to the first face 40 of the housing 22.

A fifth branch 152 includes a first and a second end 154 and 156 respectively. The first end 154 of the fifth branch 152 is optically-connected to the second end 150 of the third portion 148. The second end 156 of the fifth branch 152 is disposed adjacent to the third light source 112 such that the third beam of light is transmitted from the light source 112 to the sscond end 156 of the fifth branch 152 towards the third termination 110 of the third portion 148.

A sixth branch 158 includes a first and a second end 160 and 162 respectively. The first end 160 of the sixth branch 158 is optically-connected to the second end 150 of the third portion 148. The second end 162 of the sixth branch 158 is disposed adjacent to the third photosensitive device 114 such that the third beam of light is reflected from the portion of the surface S of the stream 24 back through the third portion 148 and is transmitted through the sixth branch 158 toward the third photosensitive device 114.

The respective terminations 92, 94 and 110 of the first, second and third fiberoptics 42, 44 and 108 are elongate in a direction transverse relative to the direction of flow of the fluid stream 24 as indicated by the arrow DF of FIG. 2 such that misalignment of either of the first and second terminations 92 and 94 respectively or the first and third terminations 92 and 110 respectively or 94 and 110 respectively relative to the direction of flow DF of fluid results in substantially no variation between the respective signals generated by the first and second photosensitive devices 32 and 36 respectively or the first and third photosensitive devices 32 and 114 respectively or the second and third photosensitive devices 36 and 114 respectively dependent on whether the apparatus 10 is used for a relatively low, fast or medium flowing stream.

Figure 15:
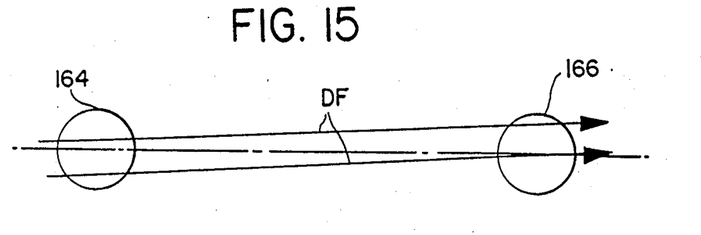
FIG. 15 is a diagramatic representation showing the effect of misalignment of a first and second beam of light when substantially circular beams of light are transmitted towards the surface of the stream.
Figure 16:
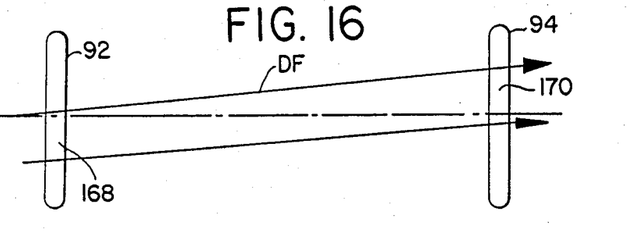
FIG. 16 is a diagramatic representation showing how such misalignment shown in FIG. 15 causes negligible variations in the electronic signals when elongate terminations of the fiberoptic bundles are provided according to the present invention.

As shown with reference to FIG. 15, in the device taught by the aforementioned copending patent application, the first and second terminations of the first and second fiberoptic bundles were substantially circular in cross sectional configuration and if these first and second circular terminations 164 and 166 were misaligned relative to the direction of flow indicated by the arrow DF, a substantial difference in signal patterns was generated as a result of such misalignment. By the provision of elongate terminations 92 and 94 as snown in FIG. 16 and according to the present invention, that portion 168 of the liquid stream 24 flowing past the first elongate termination 92 is substantially identical in cross sectional area to that portion 170 flowing past the second termination 94 even though the first and second terminations 92 and 94 are misaligned relative to the direction of flow of the fluid as indicated by the arrow DF.

Figure 17:
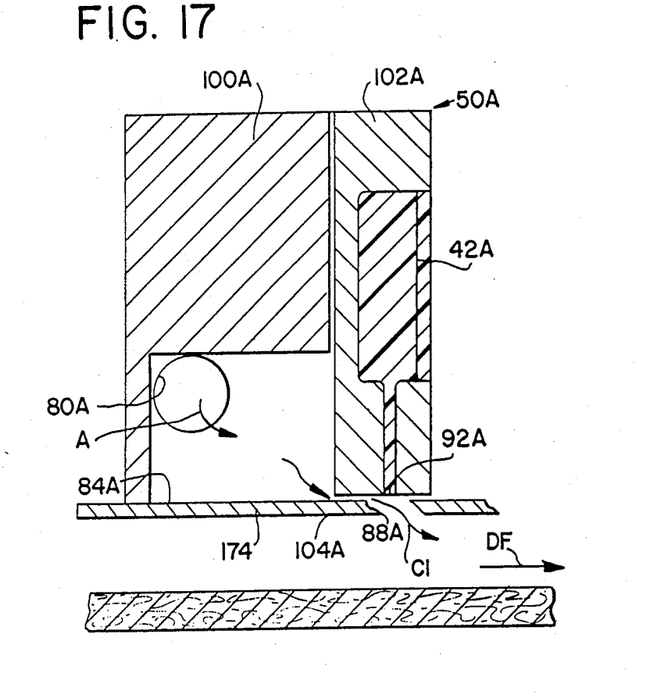
FIG. 17 is a sectional view similar to that shown in FIG. 13 but showing an alternative housing having a separate bottom plate.

In an alternative embodiment of the present invention as shown in FIG. 17, similar parts are referred to with a similar reference numeral to those of the preferred embodiment. However, such reference numerals include the suffix A. In the alternative embodiment, a bottom plate 174 is machined to provide a first, second and third orifice respectively for the first, second and third plenums. The first orifice 88A is shown in FIG. 17 defined by a first lip 104A. The bottom plate 174 is secured to the first portion 100A of the second member 50A by any suitable means such as threaded fastener means (not shown).

In operation of the jet velocity measuring apparatus 10 according to the present invention, the housing 22 is adjusted such that the first face 40 is disposed substantially in a plane P1 parallel to the plane P2 of the upper or adjacent surface S of the pulp jet or stream 24 flowing from the slice 28 onto the forming wire 30. The housing 22 is also adjusted such that the first termination 92 is disposed upstream relative to the second termination 94. The elongate terminations 92 and 94 are disposed substantially transverse relative to the direction of flow DF of the jet 24 from the slice 28. However, in view of the elongate configuration of the terminations 92 and 94, any slight misalignment of the therminations 92 and 94 from the aforementioned transverse attitude has a negligible effect on the generation of equivalent signal patterns received from the first and second photosensitive devices 32 and 36 respectively.

When the measuring apparatus 10 is used for measuring relatively low velocity jets emanating from the slice 28 of the headbox 26, only the signals generated by the first and second photosensitive devices 32 and 36 are red to the various signal-comparative equipment described in the aforementioned copending patent application to Parker. However, when the measuring apparatus 10 is used for measuring the jet velocity of a relatively high velocity jet, the signals generated by the first and third photosensitive devices 32 and 114 are fed to the electronic-comparative circuitry (not shown). For medium speet jets, the second and third photosensitive devices 36 and 114 are used.

The third termination 110 also is swept by a third curtain C3 from a third plenum 172 as shown in FIG. 11.

During the measurement of the jet velocity, whether a relatively high, medium or low velocity, the first channel 62 is connected to a source of air pressure such that curtains of air C1, C2 and C3 flow from the respective plenums 84, 86 and 172 guided by the lips 104, 106 and 107 in order to provide a debris-deflecting flow across the respective terminations 92, 94 and 110 thereby inhibiting the accumulation of pulp particles or other debris on the terminations 92, 94 and 110.

In view of the close proximity (0.6 centimeters) of the terminations 92, 94 and 110 are to the surface of the jet 24, certain problems had been experienced with the accumulation of such pulp particles building up on the terminations of the fiberoptic bundles and such accumulation of debris had the effect of impairing the transmission of the respective beams of light, thus reducing the sensitivity and reliability of the measuring apparatus.

The present invention, by providing a curtain of debris-deflecting air across the terminations, completely overcomes the aforementioned problem and it has been found to be particularly advantageous to direct the flow of air from the respective plenums in the same direction as the direction of flow DF of the pulp stream.

In practice, the source of pressurized air supplied to the respective plenums is in the order of 20 pounds per square inch with an air flow of 0.5 cubic feet per minute. This pressure has in now way been found to interfere with the upper configuration of the adjacent surface S of the pulp jet stream.

The present invention not only provides a simple and efficient means for deflecting debris away from the fiberoptic terminations of a jet velocity measuring apparatus, but also provides an apparatus that will not be unduly affected by slight misalignments relative to the fluid stream. Furthermore, the present invention permits use of the apparatus selectively for relatively fast, medium or low jet velocities.

It will be apparent to those skilled in the art that many variations of the present invention may be employed and that the preferred embodiment of the present invention, as disclosed herein before, is only one example of attaining the desired results. However, it should be appreciated that these variations fall within the spirit and scope of the present invention as defined by the appended claims.

What is claimed is:

1. A jet velocity measuring apparatus for measuring the velocity of a fluid stream, said apparatus measuring the time delay between primary electronic signals generated by a firsst photosensitive device as a result of a first beam of light from a light source being reflected by a portion of the surface of the stream and secondary electronic signals generated by a second photosensitive device as a result of a second beam of light from a light source being reflected downstream by substantially the same portion of the surface of the stream, said apparatus comprising in combination:

a housing disposed adjacent to the fluid stream, said housing having a first face;

a first bifurcated fiberoptic bundle secured to said housing adjacent to said first face for transmitting the first beam of light from the light source to the portion of the surface of the stream and back towards the first photosensitive device;

a second bifurcated fiberoptic bundle secured to said housing and terminating adjacent to said first face and downstream relative to said termination of said first fiberoptic bundle, said second fiberoptic bundle transmitting the second beam of light from the light source to substantially the same portion of the surface of the stream when this portion of the surface of the stream has flowed downstream away from the first beam of light, said second fiberoptic bundle transmitting the reflected second beam of light back along said second fiberoptic bundle towards the second photosensitive device;

debris deflecting means disposed adjacent to said first face of said housing for deflecting debris from said first face of said housing thereby inhibiting accumulation of debris on said first face which could otherwise impede transmission of the first and second beams of light towards and away from the fluid stream;

said respective terminations of said first and second fiberoptic bundles being elongate in a direction transverse relative to the direction of flow of the fluid stream such that misalignment of said terminations of said first and second fiberoptic bundles relative to the direction of flow of the fluid stream results in substantially no variation between the respective signals generated by the first and second photosensitive devices; and said portion of the surface of the stream adjacent to said first bifurcated fiberoptic bundle having a surface area the same as said portion of the surface of the stream adjacent to said second bifurcated fiberoptic bundle due to said elongate configuration of said respective fiberoptic bundles even when the disposition of said fiberoptic bundles are misaligned relative to said direction of flow of said fluid stream.

2. A jet velocity measuring apparatus as set forth in claim 1 wherein said housing is adjustably disposed adjacent to the adjacent surface of the stream.

3. A jet velocity measuring apparatus as set forth in claim 1 wherein said housing further includes:
   a first member which defines a first channel which in use of the apparatus is connected to a source of gaseous pressure;
   a second member disposed adjacent to said first member, said second member defining a first and a second opening for the reception therein respectively of said first and second fiberoptic bundle such that said terminations of said first and second fiberoptic bundles are disposed substantially coplanar with said first face of said housing, said second member further defining a second channel which is in fluid communication with said first channel;
   a third member disposed adjacent to said second member such that said second member is disposed between said first and third members, said third member defining a third channel which is in fluid communiction with said second channel, said third member further defining a fourth channel which is disposed transversely relative to and in fluid communication with said third channel.

4. A jet velocity measuring apparatus as set forth in claim 3 wherein said third member defines a fifth channel disposed transversely relative said fourth channel, said third member also defining a sixth and seventh channel which extend from said transverse fifth channel toward said second member and in fluid communication therewith;
   said second member further defines an eighth and ninth channel such that the eighth and ninth channels are in fluid communication with respectively said fifth and sixth channel of said third member;
   said second member further defining a first and second plenum such that said first and second plenums are in fluid communication respectively with said seventh and eighth channels so that in use of the apparatus said first and second plenums are pressurized from the source of gaseous pressure;
   a first and a second orifice defined by said second member such that said first and second orifices extend respectively from said first and second plenums towards said first and second terminations respectively such that a gaseous curtain extends from said plenums through said orifices and past said terminations for inhibiting the accumulation of debris adjacent to said terminations.

5. A jet velocity measuring apparatus as set fourth in claim 4 wherein said first and second orifices are elongate slots defined by said second member, said second member further including;
   a first lip of said first orifice exposed adjacent to the adjacent surface of the stream, said first lip extending towards said termination of said first fiberoptic bundle such that a first gaseous debris-deflecting curtain is directed past said termination of said first fiberoptic bundle;
   a second lip of said second orifice disposed adjacent to the adjacent surface of the stream, said second lip extending towards said termination of said second fiberoptic bundle such that a second gaseous debris-deflecting curtain is directed past said termination of said second fiberoptic bundle.

6. A jet velocity measuring apparatus as set forth in claim 3 wherein said first member defines a first and second threaded aperture for adjustably securing said housing at a predetermined distance relative to the adjacent surface of the stream.

7. A jet velocity measuring apparatus for measuring the velocity of a fluid stream, said apparatus measuring the time delay between primary electronic signals generated by a first photosensitive device as a result of a first beam of light from a light source being reflected by a portion of the surface of the stream and secondary electronic signals generated by a second photosensitive device as a result of a second beam of light from a light source being reflected downstream by substantially the same portion of the surface of the stream, said apparatus comprising in combination:
   a housing disposed adjacent to the fluid stream, said housing having a first face;
   a first bifurcated fiberoptic bundle secured to said housing adjacent to said first face for transmitting the first beam of light from the light source to the portion of the surface of the stream and back towards the first photosensitive device;
   a second bifurcated fiberoptic bundle secured to said housing and terminating adjacent to said first face and downstream relative to said termination of said first fiberoptic bundle, said second fiberoptic bundle transmitting the second beam of light from the light source to substantially the same portion of the surface of the stream when this portion of the surface of the stream has flowed downstream away from the first beam of light, said second fiberoptic bundle transmitting the reflected second beam of light back along said second fiberoptic bundle towards the second photosensitive device;

a third fiberoptic bundle secured to said housing adjacent to said first face and further downstream relative to said termination of said second fiberoptic bundle, said third fiberoptic bundle transmitting a third beam of light from the light source to substantially the same portion of the surface of the stream when this portion of the surface of the stream has flowed further downstream past said termination of said second fiberoptic bundle, said third fiberoptic bundle transmitting the reflected third beam of light back along said third fiberoptic bundle towards a third photosensitive device thereby increasing the sensitivity of the measuring apparatus when measuring a relatively fast flowing stream; and debris-deflecting means disposed adjacent to said first face of said housing for deflecting debris from said first face of said housing thereby inhibiting accumulation of debris on said first face which could otherwise impede transmission of the first and second beams of light towards and away from the fluid stream.

8. A jet velocity measuring apparatus as set forth in claim 7 wherein said first and third fiberoptic bundles are selectively used when measuring the jet velocity of a relatively fast fluid stream.

9. A jet velocity measuring apparatus as set forth in claim 7 wherein said first fiberoptic bundle includes:

a first portion having a termination and a second end, said termination being anchored within said housing with said termination of said first portion being disposed substantially coplanar with said first face of said housing so that the first light beam emerges substantially normal relative to said first face of said housing;

a first branch having a first and a second end, said first end of said first branch being optically connected to said second end of said first portion, said second end of said first branch being disposed adjacent to the light source such that the first light beam is transmitted from the source of light to the second end of the first branch towards the termination of the first portion;

a second branch having a first and a second end, said first end of said second branch being optically connected to said second end of said first portion, said second end of said second branch being disposed adjacent to the first photosensitive device such that the first beam of light reflected from the portion of the surface of the stream back through said first portion is transmitted through said second branch towards the first photosensitive device;

said second fiberoptic bundle including:

a second portion having a second termination and a second end, said second termination being anchored within said housing with said second termination of said second portion being disposed substantially coplanar with said first face of said housing so that the second light beam emerges substantially normal relative to said first face of said housing;

a third branch having a first and a second end, said first end of said third branch being optically connected to said second end of said second portion, said second end of said third branch being disposed adjacent to the light source such that the second light beam is transmitted from the source of light to the second end of said third branch towards said second termination of said second portion;

a fourth branch having a first and a second end, said first end of said fourth branch being optically connected to said second end of said second portion, said second end of said fourth branch being disposed adjacent to the second photosensitive device such that the second beam of light reflected from the portion of the surface of the stream back through said second portion is transmitted through said fourth branch towards the second photosensitive device;

said third fiberoptic bundle including:

a third portion having a third termination and a second end, said third termination being anchored within said housing with said third termination of sais third portion being disposed substantially coplanar with said first face of said housing so that the third light beam emerges substantially normal relative to said first face of said housing;

a fifth branch having a first and a second end, said first end of said fifth branch being optically-connected to said second end of said third portion, said second end of said fifth branch being disposed adjacent to the light source such that the third light beam is transmitted from the source of light to the second end of the fifth branch towards the third termination of the third portion;

a sixth branch having a first and a second end, said first end of said sixth branch being optically connected to said second end of said third portion, said second end of said sixth branch being disposed adjacent to a third photosensitive device such that the third beam of light reflected from the portion of the surface of the stream back through said third portion is transmitted through said sixth branch towards said third photosensitive device.

10. A jet velocity measuring apparatus as set forth in claim 7 wherein said first and second fiberoptic bundles are used for measuring the velocity of a relatively low speed jet, said second and third bundles are used for measuring medium speed jets and said first and third bundles are used for measuring high speed jets.

* * * * *